(12) United States Patent
Carpenter et al.

(10) Patent No.: US 11,803,460 B1
(45) Date of Patent: Oct. 31, 2023

(54) AUTOMATIC AUDITING OF CLOUD ACTIVITY

(71) Applicant: Amazon Technologies, Inc., Seattle, WA (US)

(72) Inventors: Curt Carpenter, Kirkland, WA (US); Samuel Koppes, Bothell, WA (US); Jeffery McRae, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 902 days.

(21) Appl. No.: 16/287,793

(22) Filed: Feb. 27, 2019

(51) Int. Cl.
*G06F 16/30* (2019.01)
*G06F 11/34* (2006.01)
*G06F 16/23* (2019.01)
*G06F 9/54* (2006.01)

(52) U.S. Cl.
CPC .......... *G06F 11/3476* (2013.01); *G06F 9/542* (2013.01); *G06F 9/547* (2013.01); *G06F 16/2358* (2019.01)

(58) Field of Classification Search
CPC ... G06F 16/2358; G06F 11/3476; G06F 9/542; G06F 9/547
See application file for complete search history.

(56) References Cited

U.S. PATENT DOCUMENTS

| | | | |
|---|---|---|---|
| 10,803,169 B1* | 10/2020 | Flatten et al. | G06F 21/554 |
| 2013/0007865 A1* | 1/2013 | Krishnamurthy et al. | G06F 21/552 726/7 |
| 2014/0279920 A1* | 9/2014 | Madhavarapu et al. | G06F 16/2358 707/649 |
| 2018/0027006 A1* | 1/2018 | Zimmermann et al. | H04L 63/0245 726/11 |

OTHER PUBLICATIONS

Amazon.com," AWS CloudTrail Adds Support for AWS Organizations," Posted on Nov. 19, 2018, 4 pages.
docs.aws.com,"AWS Cloud Trail User Guide Version 1.0," 2019, 229 pages.
Manual entitled "AWS Cloud Trail User Guide Version 1.0", dated Dec. 8, 2017, by Amazon, available at https://web.archive.org/web/20171208181029/https://docs.aws.amazon.com/awscloudtrail/latest/userguide/awscloudtrail-ug.pdf (Year: 2017).*
Manual entitled "AWS CloudTrail User Guide Version 1.0" by Amazon, Copyright 2014 (Year: 2014).*

* cited by examiner

*Primary Examiner* — Mahesh H Dwivedi
(74) *Attorney, Agent, or Firm* — Nicholson De Vos Webster & Elliott LLP

(57) ABSTRACT

Techniques for defining a cloud Application Program Interface (API) event logging policy are described. A request is received to generate an organization-level event logging policy for an organization including a plurality of accounts within the cloud computing environment. Responsive to one or more inputs received through a provided graphical user interface, an organization-level event logging policy is generated defining conditions for logging cloud API events for one or more cloud APIs provided within the cloud computing environment. The organization-level event logging policy is applied to log cloud API events generated by the plurality of accounts. At least one cloud API event log entry is written to a data repository within the cloud computing environment, as specified by the organization-level event logging policy.

20 Claims, 10 Drawing Sheets

AUTOMATIC AUDITING OF CLOUD ACTIVITY

BACKGROUND

The present disclosure relates to event logging in a cloud computing environment, and more specifically, to techniques that enable automating auditing of cloud activity through the use of an organization-level event logging policy.

Logging has historically been used for a variety of different purposes in software application development and management. For example, debug logs can be used by software developers to assist in identifying problems within a software application (e.g., within the source code of the application, within the configuration files for the application, etc.). As another example, many business entities may be required to maintain certain event logs (e.g., data access logs) in order to ensure compliance with laws or regulations.

Today, business entities are maintaining more software applications and higher complexity software applications than ever before. As a result, it has become increasingly difficult for businesses to ensure consistent logging and compliance across all of their applications. This difficulty can be exacerbated in a cloud computing environment, where the various software applications may be maintained using different accounts (e.g., for security reasons) and, practically speaking, are frequently maintained by different teams of engineers as well. Moreover, many modern software applications leverage external services and make numerous Application Program Interface (API) calls to these external services during execution. As a result, a challenge exists in coordinate logging across these software applications and the external services they use.

DETAILED DESCRIPTION

Figure 1A:
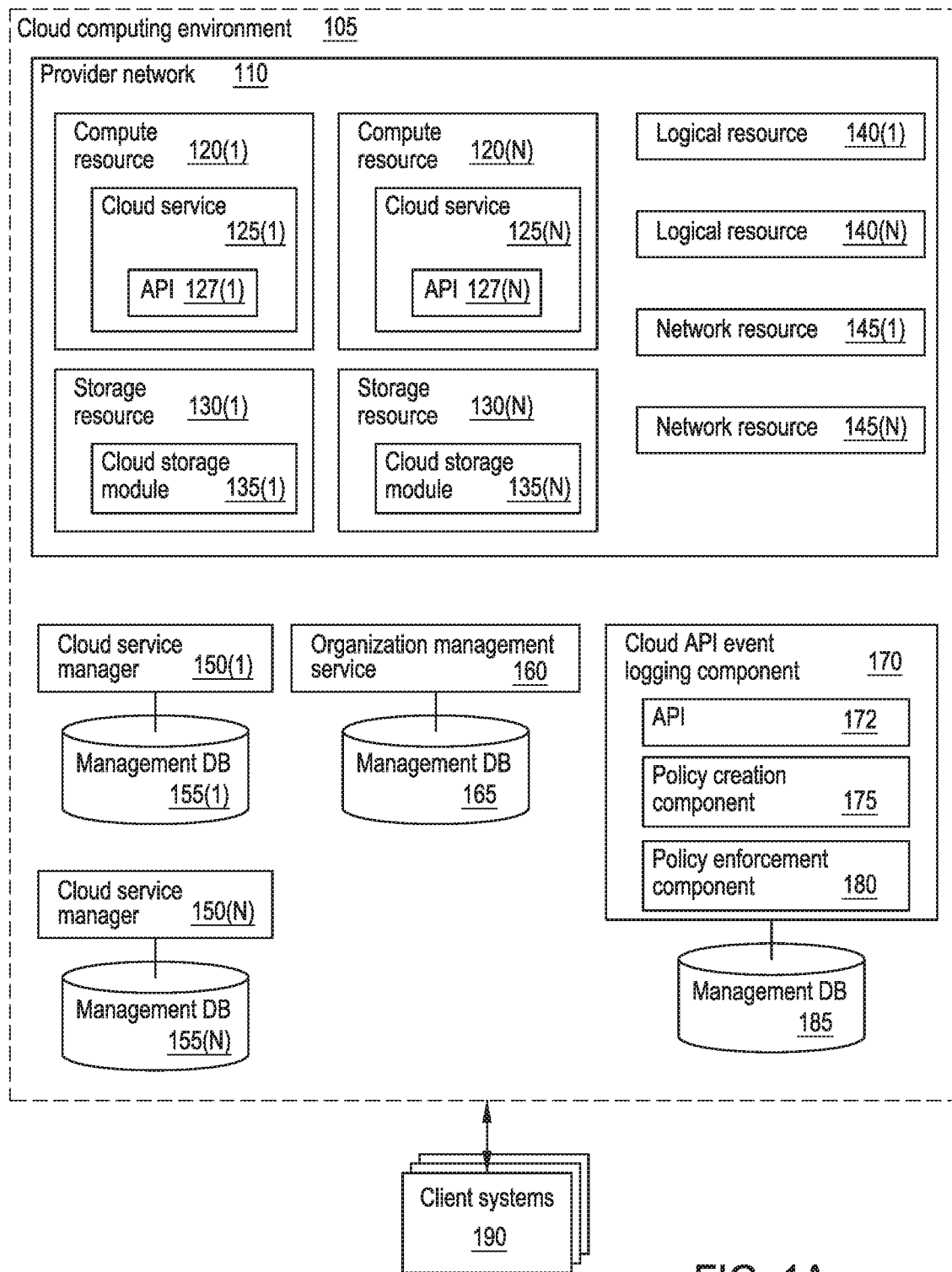
FIG. 1A is a block diagram illustrating a cloud computing environment configured with a cloud API event logging component, according to one embodiment described herein.

Various forms of logging have historically been used in software application development and management. Software developers can use debug logs to assist in identifying problems within a software application, data access logs and other event logs can be maintained to ensure compliance with laws or regulations, and so on. As organizations today are maintaining more software applications and higher complexity software applications than ever before, a technical challenge has arisen in ensuring consistent logging and compliance across all of an organization's applications. This difficulty can be exacerbated in a cloud computing environment, where the software applications can be spread across different accounts and regions, and are frequently maintained by different teams of engineers. Current solutions struggle to maintain compliance across all applications, regions and accounts, and frequently consume additional computing resources (e.g., to execute scripts adapted to update multiple accounts) and storage resources (e.g., as logs for each application may be spread across multiple, disparate storage locations, rather than a centralized storage location).

As such, embodiments described herein provide techniques for creating and enforcing an organization-level event logging policy for a plurality of accounts of an organization within a cloud computing environment. In the context of the present disclosure, an event logging policy can also be referred to as a trail or a CloudTrail. Embodiments can generate an organization-level event logging policy that defines conditions for logging cloud API events for a plurality of accounts within the organization. Embodiments can apply the organization-level event logging policy to capture cloud Application Program Interface (API) events for the plurality of accounts. As an example, the cloud computing environment could provide a number of services, and each service can provide one or more publicly accessible (within the cloud computing environment) APIs. The organization-level event logging policy can define conditions for logging calls made by an application to these publicly accessible APIs. Embodiments can write the captured cloud API events to a centralized data storage container within the cloud computing environment, as specified by the organization-level event logging policy. For example, the organization-level event logging policy could define a centralized cloud storage container as a default location for storing cloud API event log entries collected according to the organization-level event logging policy. Doing so enables organizations to ensure logging compliance across all of their accounts, while frequently saving data storage resources by storing the logging event entries in a centralized data storage location and avoiding redundant data storage locations. Moreover, embodiments can conserve computational resources, by avoiding the need to create and execute scripts designed to update multiple disparate account-level logging policies for accounts across the organization.

FIG. 1A is a block diagram illustrating a cloud computing environment configured with a cloud API event logging component, according to one embodiment described herein. The system 100 includes a cloud computing environment 105, which includes a provider network 110 with a plurality of resources of various types (including compute resources 120(1)-(N), storage resources 130(1)-(N), networking resources 145(1)-(N), and logical resources 140(1)-(N)). The cloud computing environment 105 further includes service managers 150(1)-(N) for various types of network-accessible distributed services implemented using the resources.

In the depicted example system 100, compute resources 120(1)-(N), which may for example comprise virtual compute instances running any desired virtual machine image, are configurable to host executable service implementation modules for various services. As shown, the compute resources 120(1)-(N) host cloud services 125(1)-(N). Likewise, the cloud services 125(1)-(N) each provide an API 127(1)-(N). Generally, the APIs 127(1)-(N) may be publicly accessible (or at least accessible to authorized parties) within the cloud computing environment 105. For example, the cloud service provider could provide the cloud services 125(1)-(N) for account holders within the cloud computing environment 105, and the APIs 127(1)-(N) could be available to all account holders within the cloud computing environment 105. The cloud services 125(1)-(N) could include, without limitation, database management systems (DBMS) and other data storage services (e.g., data lake services, data warehousing services, etc.), search services, orchestration services, streaming services, analytics services, and so on.

Storage resources 130(1)-(N) may comprise storage components used by various services, including the cloud services 125(1)-(N). In the depicted embodiment, the storage resources 130(1)-(N) include cloud storage modules 135(1)-(N). For example, storage resource 130(1) includes cloud storage module 135(1), which could be used by cloud service 125(1). Logical resources 140(1)-(N) (which may for example comprise representations, storable in volatile or non-volatile memory devices, of various data structures comprising metadata and/or state information associated with other resources and with various services) and networking resources 145(1)-(N) may also be used, e.g., in combination with compute and/or storage resources for providing the various services shown.

Additionally, the cloud computing environment 105 includes cloud service managers 150(1)-(N), which are connected to management databases 155(1)-(N). In one embodiment, the cloud service managers 150(1)-(N) are implemented using resources owned by the provider network operator. In a particular embodiment, the cloud service managers 150(1)-(N) may include external third-party service managers. In some embodiments, third-party-owned services may also be managed by service managers implemented using the resources of the provider network. Generally, each service manager 150(1)-(N) is responsible for coordinating the implementation of a respective distributed service accessible via the Internet or other networks to client systems 190. For example, a given service may be built using a combination of compute, storage, networking and logical resources of provider network 110, with implementation modules residing on a dynamically-changing set of compute resources 120(1)-(N), accessing data resident on storage components of various storage resources 130(1)-(N), and so on.

In one embodiment, the cloud computing environment 105 includes an access manager responsible for managing administrative access permissions, roles and capabilities for the various resources of the provider network. For example, such an access manager may maintain records indicating which entities (e.g., client systems 190, or service managers 150(1)-N)) have rights to access various resources (e.g., compute resources 120(1)-N), storage resources 130 (1)-N), logical resources 140(1)-N) and networking resources 145(1)-N)), which specific access policies apply in each case, which types of operations are permitted and which are prohibited, and so on. The records may be stored in a persistent repository such as an access management database. The access-related information maintained by the access manager may include the designated owners for various resources—e.g., the client or service manager to whom ownership rights are granted and billing responsibility is assigned for each resource type or resource instance, as well as the specific set of operations permitted as part of the ownership rights. In the depicted embodiment, a given resource may be owned by either a client or a service manager 150(1)-(N). At least some service manager-owned resources, such as a compute resource 120(1)-(N) configured to implement back-end database functionality of a database service, may be dedicated for implementation modules or storage components of the corresponding service alone. Other resources, such as a subset of service manager-owned resources, or client-owned resources, may comprise modules and/or components of more than one service.

Various embodiments of methods and apparatus for provider-arbitrated mandatory access control policies in cloud computing environments are described. Networks set up by an entity such as a company or a public sector organization to provide one or more distributed services accessible via the Internet and/or other networks to a distributed set of clients may be termed provider networks in this document. The term "web-accessible service" may be used herein to refer to services accessible over the Internet. The services provided by the cloud services 125(1)-(N) may include, without limitation, a core set of infrastructure-related services such as cloud computing or storage platforms, as well as more advanced services that are built using the core services, such as for example database services, load balancing services, application deployment services, search services and the like. Such a provider network 110 may include numerous data centers, each comprising potentially large numbers of computing platforms, such as collections of physical and/or virtualized computer servers, storage devices, networking equipment and the like, needed to implement and distribute services offered by the provider.

In some provider networks, resources configured on the platforms may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of computer processors, the main memory size, storage device number and size, and so on) and a specified software stack (e.g., a particular version of an operating system, which may in turn run on top of a hypervisor). A number of different types of computing devices may be used alone or in combination to implement the resources of the provider network 110, including general purpose or special purpose computer servers, storage devices, network devices and the like.

In particular embodiments, some or all of the distributed, web-accessible services provided by the cloud services 125(1)-(N) have respective service managers (e.g., cloud service managers 150(1)-(N)) responsible for overall administration and coordination of the corresponding service. For some services, a service manager 150 may itself be implemented using resources of the provider network 110—e.g., program instructions implementing service manager functionality for a particular service may be executed on one or more compute servers of the provider network 110. For other services, at least a portion of a service manager may be implemented outside the provider network—e.g., an entity such as a third-party content management service provider may use computing devices in an external data center to host a service manager for a content management service that uses service modules running on resources within the provider network.

In some cases third-party service managers may also be fully implemented using the resources of the provider network 110, without recourse to external resources. Each service may be provided using a combination of a potentially large set of resources in some embodiments. For example, physical or virtual compute/storage/networking resources or instances implemented on platforms distributed across devices of one or more data centers, as well as logical resources implemented as data structures or objects within various types of volatile and/or persistent storage in the provider network. In one embodiment, at least some if the services may be multi-tenant services. The term "multi-tenant" service, as used herein, refers to a service that provides each of a plurality of clients or users a respective secure and exclusive virtual computing environment, such that for any given application supported by the service, each client is provided a customizable virtual application instance. In one embodiment, some or all of the services provided may be independently billable—e.g., a client that subscribes to or uses two services managed by respective service managers, such as a database service and a load balancing service, may be presented with distinct billing line items for each service. In a particular embodiment, one or more independently billed services may depend on other independently billed services. For instance, a data set import/export service may rely on a compute instance service and/or a block storage service, resulting in the possibility of "service stacks" comprising multiple services reliant upon, or used by, other services. In a particular embodiment, clients may be billed separately for each service of a service stack that they use, even if some core service is only used indirectly as a result of a dependency of a high-level service on that core service. In other implementations, billing for at least some core services may be consolidated with the billing for higher-level services.

In the depicted embodiment, the organization management service 160 is generally configured to manage organizational entities within the cloud computing environment 105. For example, an entity (e.g., a business) can be represented within the cloud computing environment 105 as an organizational entity. The definition for the organizational entity, as well as attributes such as accounts encompassed by the organizational entity, can be stored within the management database 165. In the context of the present disclosure, an organizational entity can include a plurality of different user accounts within the cloud computing environment 105. For instance, many organizations that host numerous different software applications within the cloud wish to spread these applications across multiple different user accounts (e.g., for security reasons). As discussed above, one challenge for organizational entities is maintaining compliance in their auditing and logging activities across all the plurality of user accounts. Using conventional techniques, such organizations may use multiple teams of engineers to apply the logging policies across the plurality of user accounts, or may write and execute scripts to apply the logging policies, consuming additional computing resources in the process. Moreover, conventional solutions may result in logging events being stored in multiple different locations, thereby consuming additional overhead and data storage resources.

In the depicted embodiment, the cloud computing environment 105 further includes a cloud API event logging component 170, coupled to a management database 185. Generally, the cloud API event logging component 170 manages the creation and application of organization-level event logging policies within the cloud computing environment 105. For example, the cloud API event logging component 170 could generate and apply a logging policy to selectively capture events generated by calls to the APIs 127(1)-(N) provided by the cloud services 125(1)-(N). As an example, the cloud API event logging component 170 could be configured to capture cloud API events that satisfy one or more conditions, as specified by the organization-level event logging policy. The cloud API event logging component 170 could then store the captured events at a cloud storage location on one or more of the storage resources 130(1)-(N), as designed by the organization-level event logging policy. Doing so enables an organization to apply an organization-level logging policy and to ensure that captured events are stored in a centralized location, thereby ensuring compliance across all the accounts of the organization and conserving data storage resources and computational resources, relative to conventional solutions.

As shown, the cloud API event logging component 170 includes an API 172, a policy creation component 175 and a policy enforcement component 180. In one embodiment, the cloud API event logging component 170 can receive requests to generate organization-level event logging policies via the API 172. The policy creation component 175 could then generate a graphical user interface (e.g., one or more web pages) for generating the organization-level event logging policy and could transmit the graphical user interface (e.g., via a web server and/or web application server) to a client system 190 for display. The graphical user interface could, for example, provide a mechanism through which a user of the client system 190 can input attributes of the organization-level event logging policy. For example, such input attributes could include one or more cloud services 125(1)-(N) to collect events from, one or more types of cloud API events to log, conditions for logging the events, one or more regions to log events for, and so on. Additionally, the graphical user interface could enable the user of the client system 190 to create one or more events or alarms, relating to collected cloud API events. For example, an alarm could be configured to activate when a certain number of cloud API events of a certain type have been received within a designated window of time (e.g., 50 error messages within a 10 minute window of time). As another example, an alarm could be set to activate when a certain pattern of behavior is observed, such as a user performing read operations across a plurality of different data stores, within a window of time. More generally, the graphical user interface could be used to define conditions for any sort of alarm, alert or notification, consistent with the functionality described herein.

The policy creation component 175, responsive to one or more inputs received through the provided graphical user interface, could generate an organization-level event logging policy data structure for the organization. For example, the organization-level event logging policy data structure could define conditions for logging cloud API events for one or more cloud APIs provided within the cloud computing environment. In one embodiment, the policy creation component 175 is configured to generate the organization-level event logging policy data structure by identifying the plurality of accounts included within the organization and then generating, for each of the plurality of accounts, a respective event logging policy based on the organization-level event logging policy. In such an embodiment, while the cloud API event logging component 170 can present a single organization-level event logging policy to users of the client systems 190, but can privately represent the organization-level event logging policy as a plurality of account-level event logging policies, with one account-level policy associated with each account within the organization. When doing so, the cloud API event logging component 170 can generate the account-level policies using organization-level permissions, so that while account owners may be able to view the policy being applied to their account, they are unable to modify or delete the policy. Doing so helps to ensure compliance across the organization.

Of note, in some instances an individual account may have an existing account-level event logging policy when the new account-level event logging policy is created, based on the new organization-level event logging policy. In such an embodiment, the cloud API event logging component 170 can combine the two event logging policies in an additive fashion. For example, if the existing policy specifies to log events A, B and C, and the new policy specifies to log events C, D and E, the combined policy could log events A, B, C, D and E. Doing so ensures that all events specified in at least one policy are logged, and avoids the need for conflict resolution logic.

The policy enforcement component 180 can then apply the generated event logging policies to log cloud API events generated by the plurality of accounts. In some instances, at least one account of the plurality of accounts can have an existing event logging policy, and the at least one event logging policy corresponding to the at least one account can be applied additively with the existing event logging policy. The cloud API event logging component 170 can then write, to a data repository within the cloud computing environment specified by the organization-level event logging policy data structure, at least one cloud API event log entry according to the organization-level event logging policy data structure. In one embodiment, the cloud API event logging component 170 can generate the organization-level event logging policy with a centralized cloud storage container (e.g., one of the cloud storage modules 135(1)-(N)) as the default storage location for event log entries.

Figure 1B:
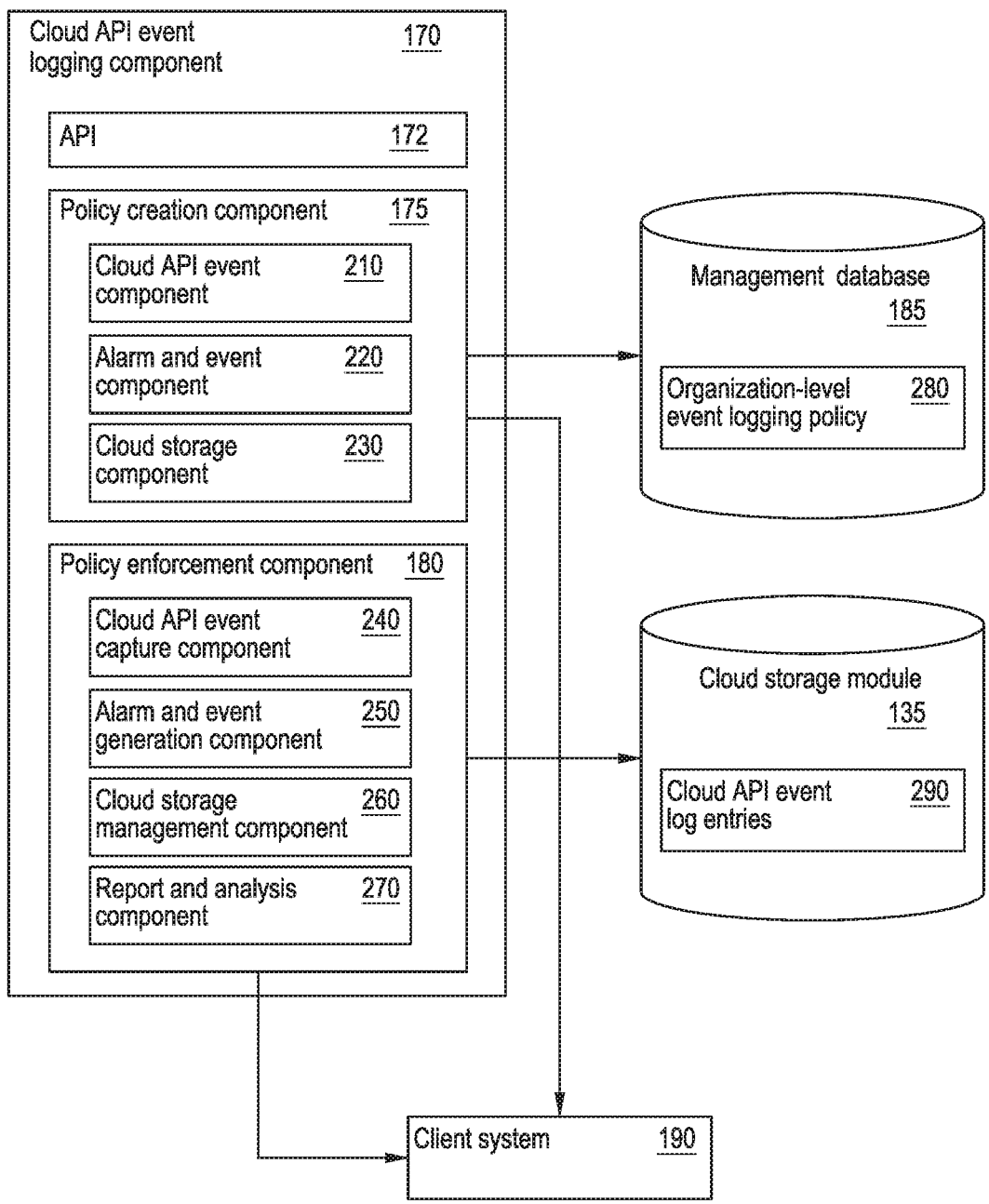
FIG. 1B is a block diagram illustrating a more detailed view of a cloud API event logging component, according to one embodiment described herein.

FIG. 1B is a block diagram illustrating a more detailed view of a system including a cloud API event logging component, according to one embodiment described herein. As shown, the system 200 includes the cloud API event logging component 170, a client system 190, the management database 185 and a cloud storage module 135. In the depicted embodiment, the cloud API event logging component 170 contains the API 172, the policy creation component 175 and the policy enforcement component 180. The policy creation component 175 contains a cloud API event component 210, an alarm and event component 220 and a cloud storage component 230. As discussed above, the policy creation component 175 is generally configured to generate the organization-level event logging policy 280. Generally, the cloud API event component 210 represents software logic for generating at least a portion of the graphical user interface that relates to the designation of cloud API events to be logged. For example, the cloud API event component 210 could be configured with data specifying the various types of cloud APIs available within the cloud computing environment 105, the types of events that can be generated at each of the available cloud APIs (e.g., data read events, data write events, etc.) and so on.

The alarm and event component 220 represents software logic for generating at least a portion of the graphical user interface that relates to the creation of alarms and events for captured cloud API events. For example, the alarm and event component 220 could provide a graphical user interface through which a user of a client system 190 could specify a conditional expression that, when satisfied, triggers the corresponding alarm. For instance, an alarm could be set to trigger when a particular pattern of behavior is observed within the captured cloud API events. As an example, a pattern could be defined as an account within the organization generating data read events across multiple different cloud services within a predefined window of time (e.g., as such a pattern of behavior could correspond with malicious activity). Additionally, the alarm and event component 220 could provide a mechanism within the graphical user interface through which the user of the client system 190 can specify what notification should be generated when the pattern is identified. For example, the graphical user interface could include a field for one or more email addresses (e.g., where the alert is sent in the form of an email), a field for one or more accounts within the cloud computing environment 105 (e.g., where the alert is sent in the form of a message within the cloud computing environment 105), a phone number capable of receiving Short Message Service (SMS) messages (e.g., where the alert is sent in the form of a SMS message) and so on.

The cloud storage component 230 is generally configured to generate a portion of the graphical user interface for specifying one or more cloud storage locations for storing the captured API events. As shown in the depicted embodiment, the cloud storage component 230 could default to (or, e.g., could receive inputs through the provided graphical user interface for) storing captured cloud API event log entries 290 within the cloud storage module 135.

In the depicted embodiment, the policy enforcement component 180 contains a cloud API event capture component 240, an alarm and event generation component 250, a cloud storage management component 260 and a report and analysis component 270. The cloud API event capture component 240 generally represents software logic configured to apply the organization-level event logging policy 280 to capture cloud API events within the cloud computing environment 105. For example, the cloud API event capture component 240 could subscribe using the cloud service APIs 127(1)-(N) to receive the cloud API events from the cloud services 125(1)-(N).

The alarm and event generation component 250 generally represents software logic that is configured to determine when an alarm condition specified within the organization-level event logging policy 280 has been satisfied and, in response, to generate and transmit the corresponding alarm message. The cloud storage management component 260 generally represents software logic that is configured to write the captured cloud API events to the storage location specified by the organization-level event logging policy 280. In the depicted embodiment, the cloud storage management component 260 is configured to write the captured cloud API event log entries 290 to the cloud storage module 135.

The report and analysis component 270 represents software logic that can provide a graphical user interface to the client system 190 for use in generating report queries and displaying the results. For example, the report and analysis component 270 could receive from the client system 190, via the provided graphical user interface, a request to generate a report containing cloud API events of a certain type within a specified range of time. The report and analysis component 270 could then generate and submit a query to retrieve select cloud API event log entries from the cloud API event log entries 290 in the cloud storage module 135. For example, the report and analysis component 270 could submit a query to the cloud service API 127 for a search service 125 within the cloud computing environment 105. The report and analysis component 270 could then format the retrieved cloud API event log entries and could generate a graphical user interface displaying the report results. The report and analysis component 270 could then transmit the generated graphical user interface with the report results to the client system 190 for display.

Figure 2:
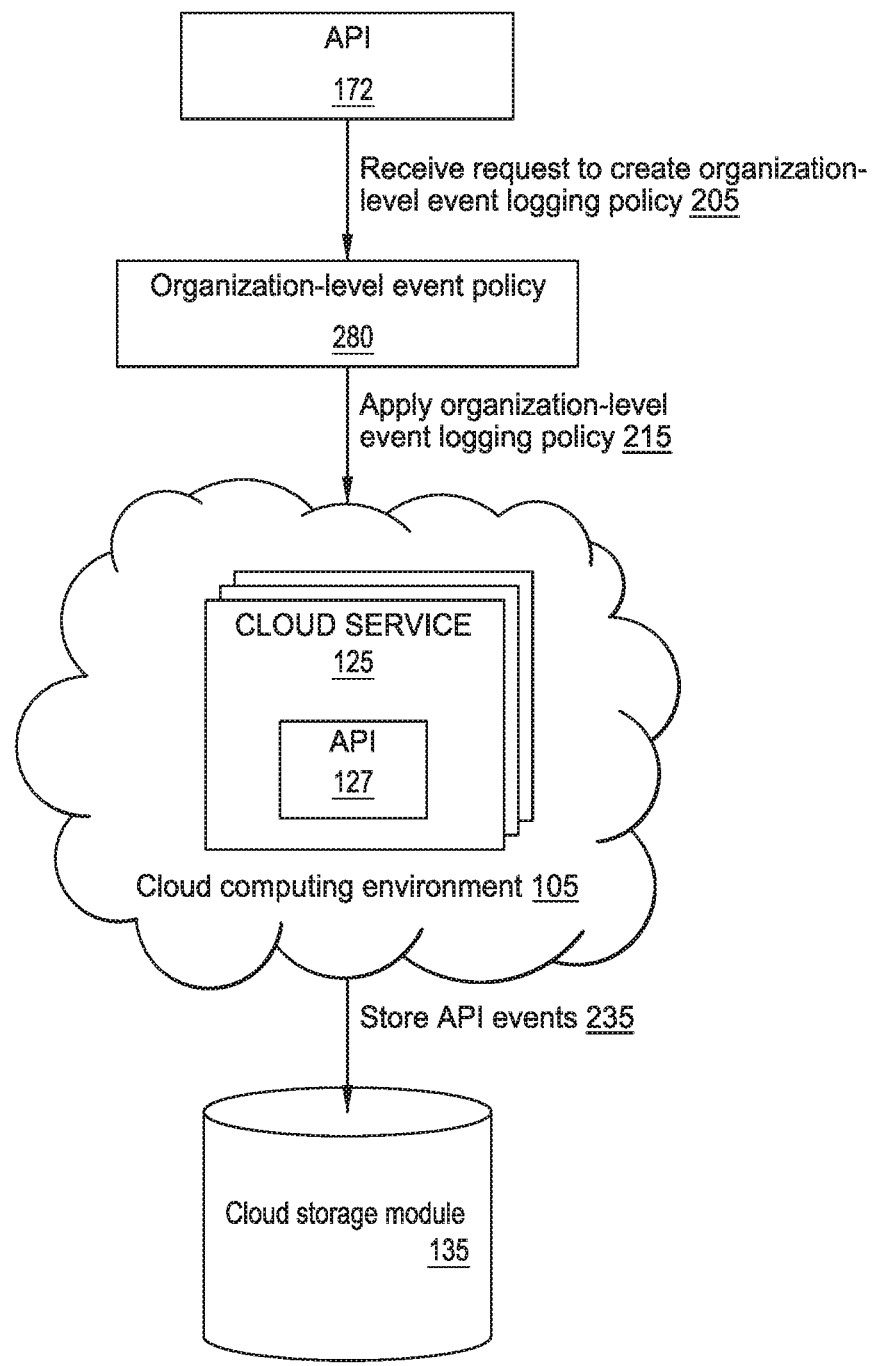
FIG. 2 is a flow diagram illustrating a method for logging events for cloud services using an organization-level event logging policy, according to one embodiment described herein.

FIG. 2 is a flow diagram illustrating a method for logging events for cloud services using an organization-level event logging policy, according to one embodiment described herein. FIG. 2 illustrates a flow for creating and enforcing the organization-level event logging policy 280 described in FIG. 1B. At step 205, using the API 172, the policy creating component can receive a request to create the organization level event logging policy 280 from one or more users. As mentioned above, the organization-level event logging policy 280 defines conditions for logging cloud API events for the organization. At step 215, the policy 280 is applied to one or more cloud services 125 to capture cloud API events for the organization. As shown, the cloud computing environment 105 provides a number of services 125, and each service 125 provides one or more publicly accessible (within the cloud computing environment) APIs 127. The organization-level event logging policy 280 can define conditions for logging calls made by an application to these publicly accessible APIs 127.

At step 235, the API events are stored in the cloud storage module 135. In one embodiment, the cloud storage module 135 is a centralized data storage container within the cloud computing environment 105, as specified by the organization-level event logging policy 280. For example, the organization-level event logging policy could define a centralized cloud storage container as a default location for storing cloud API event log entries collected according to the organization-level event logging policy 280. Doing so enables organizations to ensure logging compliance across all of their accounts, while frequently saving data storage resources by storing the logging event entries in a centralized data storage location and avoiding redundant data storage locations.

Figure 3:
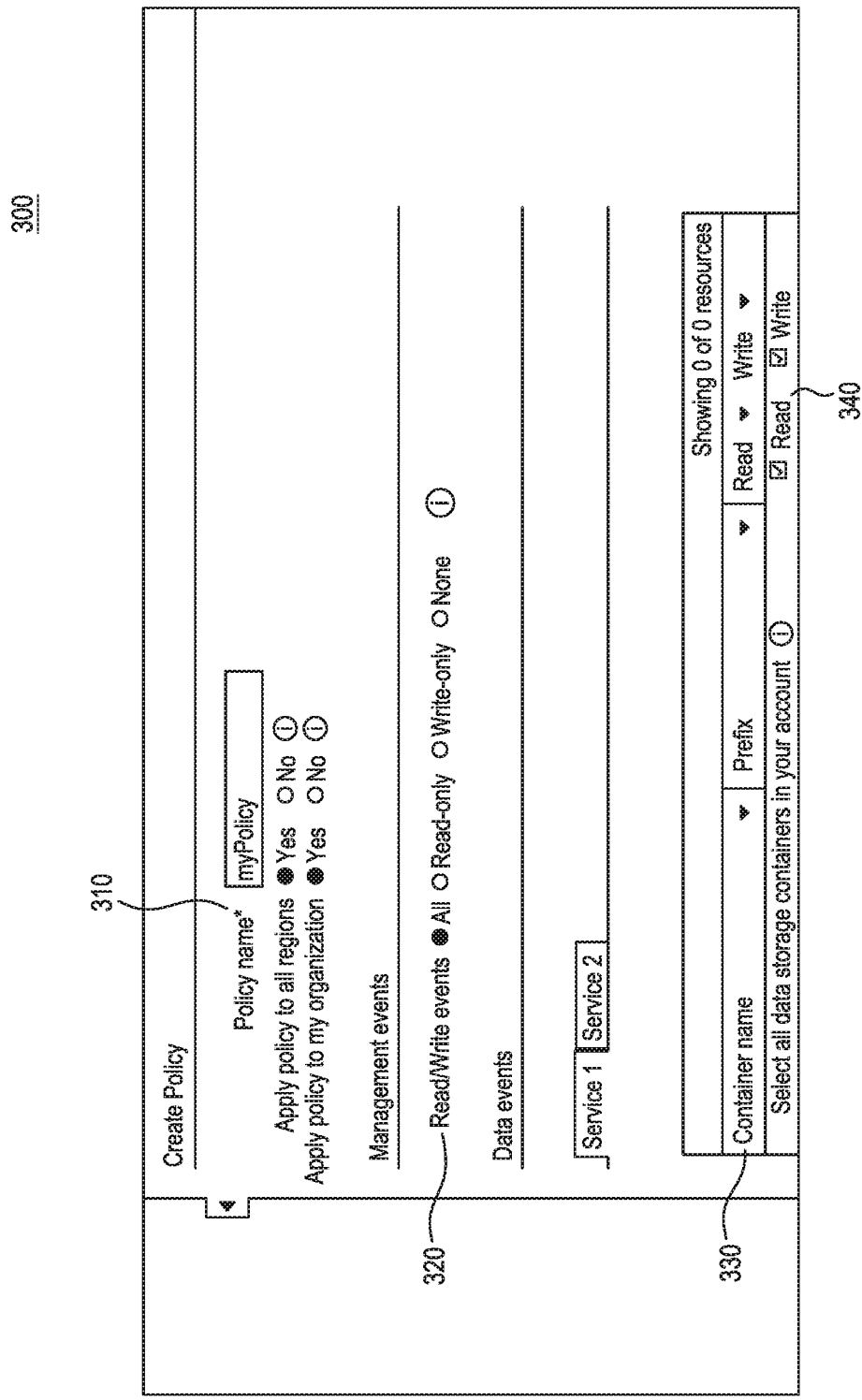
FIG. 3 is a screenshot illustrating a graphical user interface for creating a cloud API event logging policy, according to one embodiment described herein.

FIG. 3 is a screenshot illustrating a graphical user interface for creating a cloud API event logging policy, according to one embodiment described herein. As shown, the screenshot 300 includes a name 310 of the cloud API event logging policy, which in the depicted embodiment is named "myPolicy." The graphical user interface shown in the screenshot 300 further includes selection boxes where the user can select whether the policy should apply to all regions and whether the policy should be an organization-level policy or an account-level policy. As discussed above, an organization-level policy generally applies to all accounts within the organization, while an account-level policy generally applies only to the account for which the policy is created and applied. In one embodiment, an organization-level policy can be applied for a defined subset of accounts. In such an embodiment, a graphical user interface could be provided through which the organization-level administrator can specify which accounts within the organization the policy should apply to.

Additionally, the graphical user interface includes a selection field 320 where a user can select which management events should be logged, according to the cloud API event logging policy being defined. In the depicted embodiment, the selection field 320 allows the user to select from all read and write and events, read-only events, write-only events or no management events. The graphical user interface also includes a data event selection field 330, where the storage location(s) where data events should be captured can be specified. In the depicted embodiment, the graphical user interface includes a selection box for selecting all data storage containers within the organization. Additionally, the graphical user interface includes a data event type selection field 340, where the user can select whether the policy should apply to data read events and/or data write events.

Figure 4:
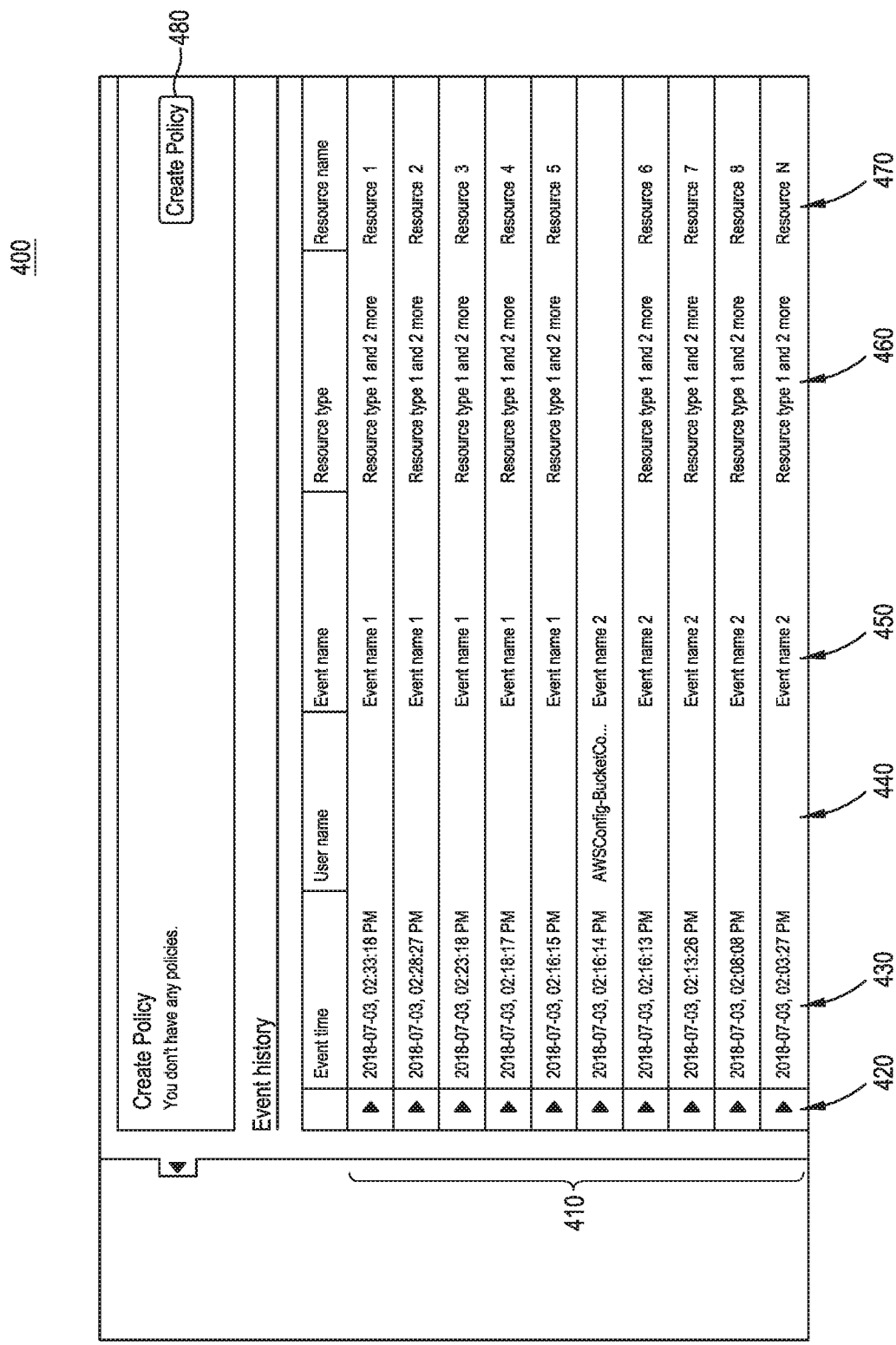
FIG. 4 is a screenshot illustrating a graphical user interface for displaying an event history for events collected according to a cloud API event logging policy, according to one embodiment described herein.

FIG. 4 is a screenshot illustrating a graphical user interface for displaying an event history for events collected according to a cloud API event logging policy, according to one embodiment described herein. As shown, the screenshot 400 includes a listing of captured cloud API events 410 that were captured according to an applied event logging policy. In the depicted embodiment, a selectable expansion symbol 420 is included in the graphical user interface for each captured cloud API event 410. Generally, when the selectable expansion symbol 420 is selected, the graphical user interface can be configured to expand the details shown for the corresponding log entry to provide the user with additional details about the particular API event. Each of the captured cloud API events 410 further includes a corresponding time stamp 430, indicating the time at which the event occurred, and a user name field 440 indicating a user name (if any) associated with the event.

Additionally, in the depicted embodiment, the graphical user interface includes an event name field 450 that specifies the name of the corresponding event, and a resource type field 460 indicating the type of resource that generated the event. For example, in the depicted example, the resource type field 460 indicates that the event relates to an Identify and Access Management (IAM) AccessKey, as well as two additional resources not currently shown. If the user wishes to see the additional resources, for example, the user could select the selectable expansion symbol 420 to expand the data shown for event in question. In addition to the type of the resource relating to the events, the graphical user interface further specifies a resource name field 470 that provides the specific unique identifier of the resource relating to the event within the cloud computing environment. The graphical user interface shown in the screenshot 400 further includes a "Create Policy" button 480, which if selected, transitions to a graphical user interface for generating a new account logging policy (e.g., the screenshot 300 shown in FIG. 3 and discussed above).

Figure 5:
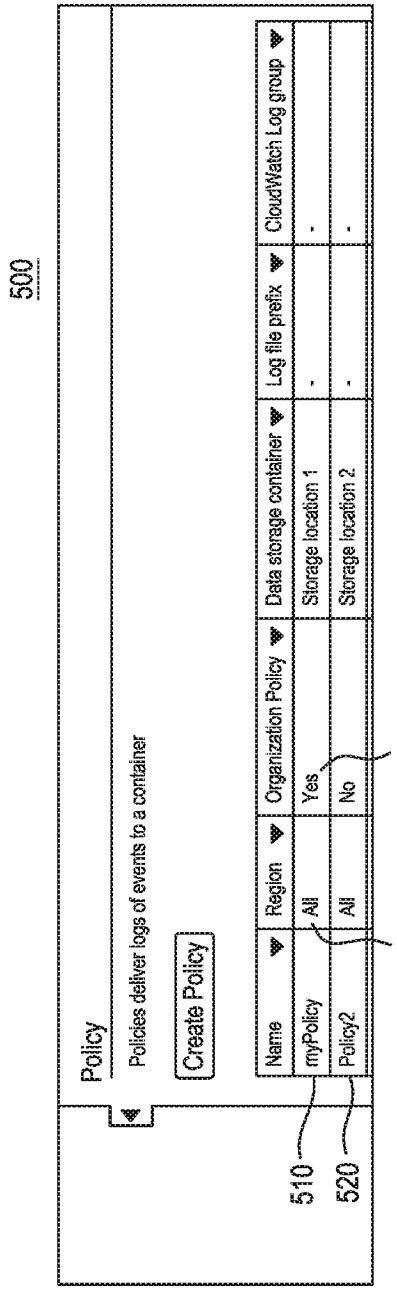
FIG. 5 is a screenshot illustrating a graphical user interface for viewing cloud API event logging policies and related attributes, according to one embodiment described herein.

FIG. 5 is a screenshot illustrating a graphical user interface for viewing cloud API event logging policies and related attributes, according to one embodiment described herein. As shown, the screenshot 500 depicts a graphical user interface that lists currently active policies for the current account session (e.g., the account that currently has an active session, when the graphical user interface is loaded). As shown, the graphical user interface depicts two currently active policies – a first policy 510 with the name "myPolicy" and a second policy 520 with a name "Policy2". The graphical user interface further contains a region field 530 that specifies which region(s) the policies apply to. In the depicted embodiment, both the first policy 510 and second policy 520 apply to all regions within the cloud computing environment 105. In one embodiment, the region is a geographic region that can be used to sub-divide the cloud computing environment 105. For example, each of the accounts may be assigned to a respective geographic region.

Additionally, the graphical user interface contains an organization-level policy field 540, which specifies whether the corresponding policy is an organization-level policy or an account-level policy. In the depicted embodiment, the first policy 510 is defined as an organization-level policy that applies to all accounts within the organization, while the second policy 520 is an account-level policy that only applies to the current account. As discussed above, when multiple logging policies are active for a given account, the policies can be combined in an additive fashion. For example, if the first policy 510 specifies to log data events A, B and C and management events X and Y, while the second policy 520 specifies to log data events C, D, and E and management event Z, the additive combination of these two policies 510 and 520 would be to log data events A, B, C, D, E and management events X, Y, Z.

Figure 6:
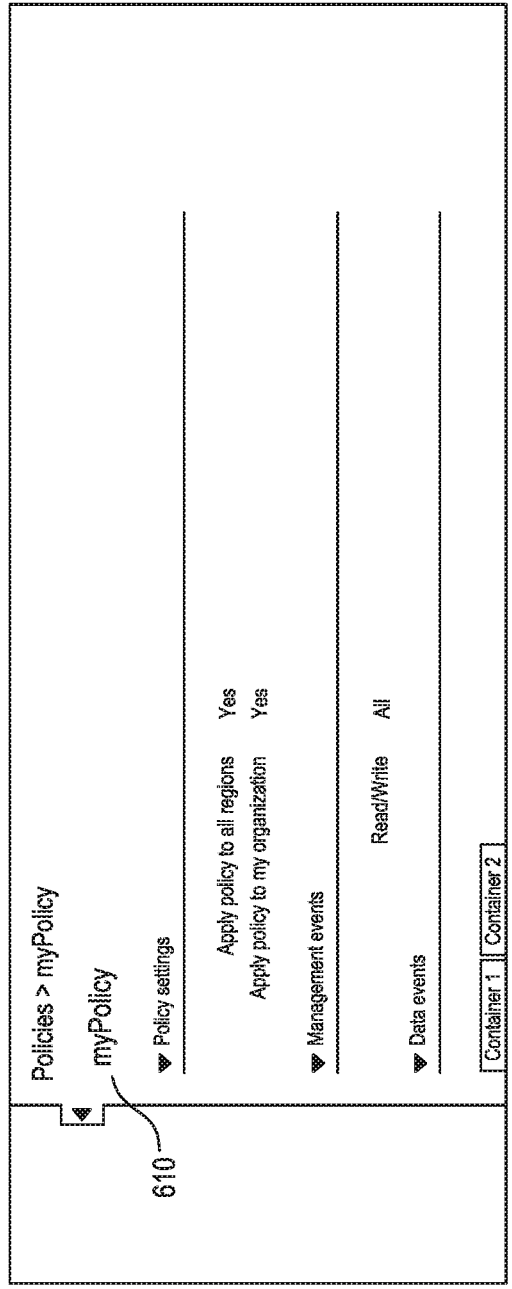
FIG. 6 is a screenshot illustrating a graphical user interface for viewing attributes of an existing cloud API event logging policy, according to one embodiment described herein.

As discussed above, while a user with account-level permissions may be able to view an organization-level policy that is being applied to the account and attributes of the organization-level policy, the user with account-level permissions may not be able to modify or de-activate the organization-level policy. Doing so helps to ensure compliance across all accounts of the organization. FIG. 6 is a screenshot illustrating a graphical user interface for viewing attributes of an existing cloud API event logging policy, according to one embodiment described herein. As shown, the screenshot 600 includes an access permissions message 610, which indicates to the user that the account in question is an organization-level policy and cannot be deleted or edited with the permissions of the account logged in during the current session (e.g., in this example, a user with account-level permissions and without organization-level permissions).

Figure 7:
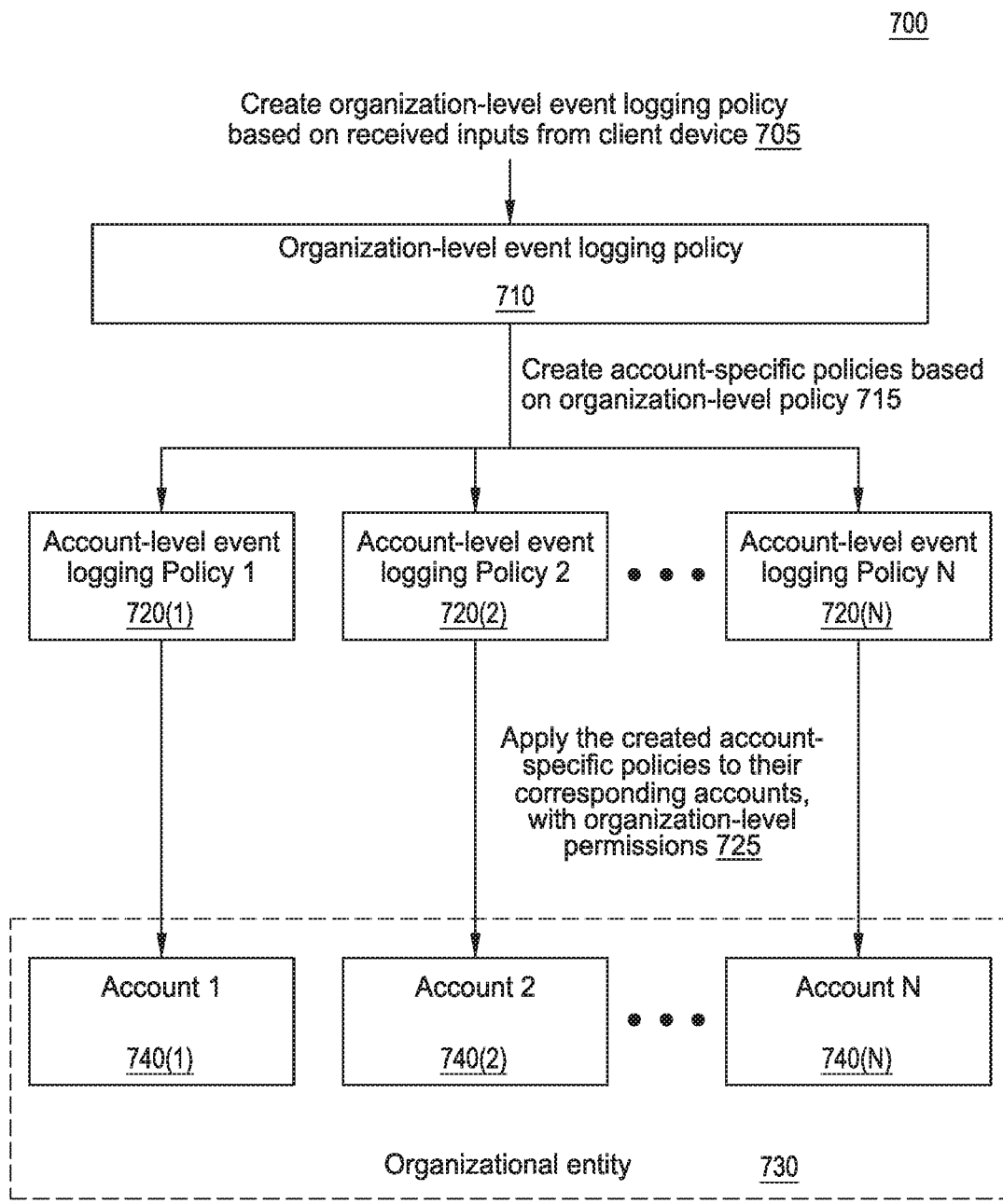
FIG. 7 is a flow diagram illustrating a method for creating account-specific cloud API event logging policies based on an organization-level event logging policy, according to one embodiment described herein.

In one embodiment, while the cloud API event logging component 170 is configured to represent the organization-level event logging policy to users as a single, high-level event logging policy, the cloud API event logging component 170 may privately generate an account-level logging policy for each account within the organization to which the organization-level policy is to be applied, and may apply these account-level logging policies to the corresponding accounts to capture cloud API events. An example of this is shown in FIG. 7, which is a flow diagram illustrating a method for creating account-specific cloud API event logging policies based on an organization-level event logging policy, according to one embodiment described herein. In the depicted workflow, the method 700 begins where an organization-level event logging policy 710 is created at step 705. For example, such a policy could be created by a user with organization-level permissions using the "Create Policy" graphical user interface shown in FIG. 3 and discussed above.

Once the organization-level event logging policy 710 is defined, at step 715, the cloud API event logging component 170 can create a plurality of account-level event logging policies 720(1)-(N), based on the organization-level policy 710. During step 725, the account specific policies are applied to their corresponding accounts with organization-level permissions. In doing so, the cloud API event logging component 170 can first determine the accounts to which the organization-level event logging policy 710 applies. For example, and without limitation, the organization-level event logging policy could be defined to apply to all accounts in all regions (e.g., a geographic region which sub-divides the cloud computing environment), some accounts in all regions, all accounts in some regions, some accounts in some regions, certain groups of accounts, and so on. The cloud API event logging component 170 then generates the account-level event logging policies 720(1)-(N) for the determined accounts 740(1)-(N) within the organizational entity 730, and applies the generated policies to the determined accounts 740(1)-(N). As discussed above, when the accounts 740(1)-(N) already have existing logging policies defined, the account-level event logging policies 720(1)-(N) can be applied with the existing logging policies in an additive fashion.

Once the newly created organization-level event logging policy 710 is applied, the accounts 740(1)-(N) within the organizational entity 370 can change over time. For example, upon receiving a request to add a first account to the plurality of accounts included in the organization, the cloud API event logging component 170 could generating a first event logging policy for the first account, based on the organization-level event logging policy data structure. The cloud API event logging component 170 could also identify any existing event logging policy associated with the first account and could applying the first event logging policy and the existing event logging policy in an additive manner to log cloud API events generated by the first account. Once the policy is applied to the first account, the cloud API event logging component 170 could write one or more cloud API event log entries according to the first event logging policy to a defined cloud storage location within the cloud computing environment 105.

Similarly, upon receiving a request to remove a second account of the plurality of accounts from the organization, the cloud API event logging component 170 could remove the second account from the plurality of accounts associated with the organization. Additionally, the cloud API event logging component 170 could remove the generated event logging policy from the second account. In doing so, the cloud API event logging component 170 could allow previously collected cloud API event log entries for the second account to remain in the data repository within the cloud computing environment 105. Moreover, once the second account is removed from the organization and the organization-level event logging policy is removed from the second account, any account-level event logging policies associated with the second account may remain unaltered.

Figure 8:
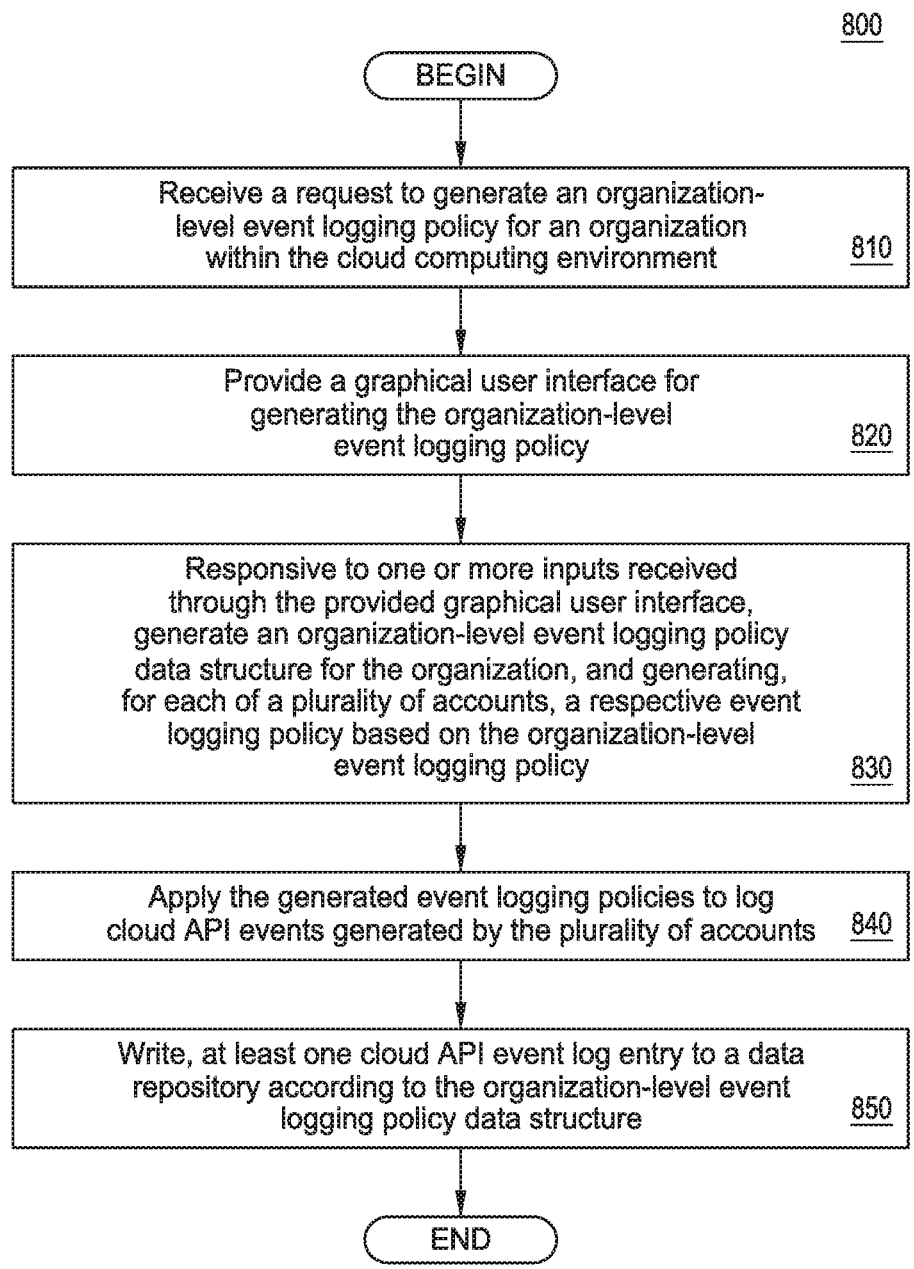
FIG. 8 is a flow diagram illustrating a method of creating and applying an organization-level event logging policy in a cloud computing environment, according to one embodiment described herein.

FIG. 8 is a flow diagram illustrating a method of creating and applying an organization-level event logging policy in a cloud computing environment, according to one embodiment described herein. As shown, the method 800 begins at block 810, where the cloud API event logging component 170 receives, at the API 172, a request to generate an organization-level event logging policy for an organization within the cloud computing environment. In the depicted embodiment, the organization comprises a plurality of accounts within the cloud computing environment. Responsive to the request, the cloud API event logging component 170 can provide a graphical user interface for generating the organization-level event logging policy (block 820).

The cloud API event logging component 170 can then receive one or more inputs through the provided graphical user interface, and in response, the cloud API event logging component 170 can generate an organization-level event logging policy data structure for the organization, where the organization-level event logging policy data structure defines conditions for logging cloud API events for one or more cloud APIs provided within the cloud computing environment (block 830). For example, the cloud API event logging component 170 could identify the plurality of accounts included within the organization and could generate, for each of the plurality of accounts, a respective event logging policy based on the organization-level event logging policy.

The cloud API event logging component 170 could then apply the generated event logging policies to log cloud API events generated by the plurality of accounts (block 840). In the depicted embodiment, at least one account of the plurality of accounts has an existing event logging policy, and the cloud API event logging component 170 additively applies the at least one event logging policy corresponding to the at least one account to the existing event logging policy. The cloud API event logging component 170 writes, to a data repository within the cloud computing environment specified by the organization-level event logging policy data structure, at least one cloud API event log entry according to the organization-level event logging policy data structure (block 850), and the method 800 ends.

Figure 9:
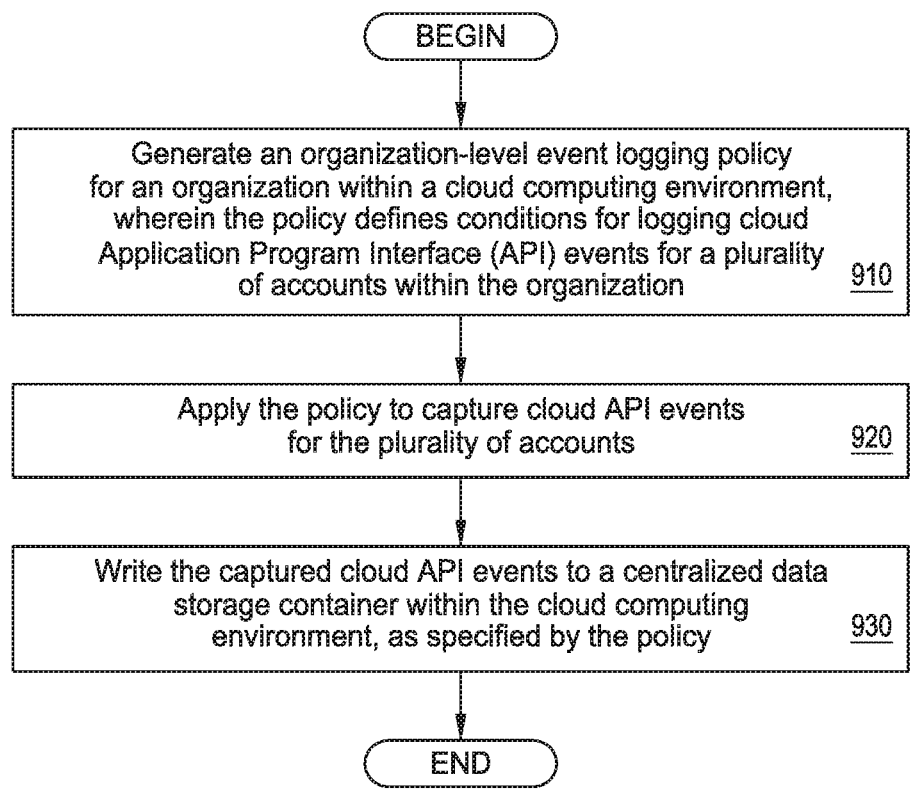
FIG. 9 is a flow diagram illustrating a method of capturing cloud API events according to an organization-level event logging policy, according to one embodiment described herein.

FIG. 9 is a flow diagram illustrating a method of capturing cloud API events according to an organization-level event logging policy, according to one embodiment described herein. As shown, the method 900 begins at block 910, where the cloud API event logging component 170 generates an organization-level event logging policy for an organization within a cloud computing environment, where the organization-level event logging policy defines conditions for logging cloud API events for a plurality of accounts within the organization. For example, the cloud API event logging component 170 could receive a request to generate the organization-level event logging policy via the API 172, and in response, the policy creation component 175 could generate a graphical user interface (e.g., for transmittal and eventual display on a client system 190) for use in generating the organization-level event logging policy. For example, the graphical user interface could provide mechanisms through which a user of a client system 190 can specify cloud API events to be logged, conditions for when to log the cloud API events, one or more data storage locations for storing cloud API event log entries, one or more regions the policy should apply to (or whether the policy should apply to all regions) and so on. The policy creation component 175 could then take the received inputs and generate an organization-level event logging policy data structure for the organization.

In the depicted embodiment, the cloud API event logging component 170 then applies the organization-level event logging policy to capture cloud API events for the plurality of accounts (block 920). For example, the cloud API event logging component 170 could transmit a request to one or more of the cloud service APIs 127(1)-(N) to subscribe to one or more types of cloud API events. The cloud API event logging component 170 writes the captured cloud API events to a centralized data storage container within the cloud computing environment, as specified by the organization-level event logging policy (block 930), and the method 900 ends.

Figure 10:
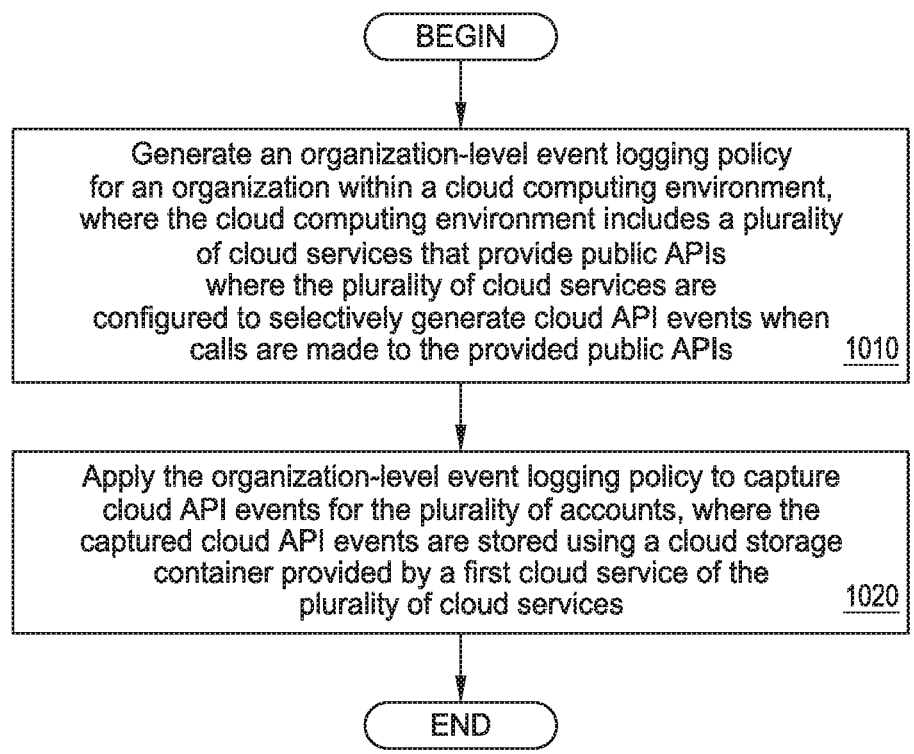
FIG. 10 is a flow diagram illustrating a method of applying an organization-level event logging policy within a cloud computing environment, according to one embodiment described herein.

FIG. 10 is a flow diagram illustrating a method of applying an organization-level event logging policy within a cloud computing environment, according to one embodiment described herein. As shown, the method 1000 begins at block 1010, where the cloud API event logging component 170 generates an organization-level event logging policy for an organization within a cloud computing environment. In the depicted embodiment, the cloud computing environment includes a plurality of cloud services that provide public APIs, the plurality of cloud services are configured to selectively generate cloud API events when calls are made to the provided public APIs, and the organization-level event logging policy defines conditions for logging cloud API events for a plurality of accounts within the organization. The cloud API event logging component 170 applies the organization-level event logging policy to capture cloud API events for the plurality of accounts, where the captured cloud API events are stored using a cloud storage container provided by a first cloud service of the plurality of cloud services (block 1020), and the method 1000 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

While the foregoing is directed to embodiments of the present invention, other and further embodiments of the invention may be devised without departing from the basic scope thereof, and the scope thereof is determined by the claims that follow.

What is claimed is:

1. A method, comprising:
receiving, at an Application Program Interface (API) of a cloud computing environment, a request to generate an organization-level event logging policy for an organization within the cloud computing environment;
providing a graphical user interface for generating the organization-level event logging policy, wherein the organization-level event logging policy identifies (i) whether a call to one or more cloud APIs provided within the cloud computing environment should be recorded as a log entry and (ii) a data repository within the cloud computing environment that should store the log entry;
responsive to one or more inputs received through the provided graphical user interface and indicating one or more regions in which to apply the organization-level event logging policy:
identifying a plurality of accounts included in the organization;
identifying multiple accounts of the plurality of accounts within the one or more regions; and
generating, for each of the multiple accounts, a respective event logging policy that implements the organization-level event logging policy, wherein users of the multiple accounts are prevented from modifying the respective event logging policies based on the respective event logging policies implementing the organization-level event logging policy;
applying to each of the multiple accounts the respective event logging policies to log calls to the one or more cloud APIs made by the multiple accounts, wherein at least one account of the multiple accounts has an existing event logging policy, and wherein one of the event logging policies corresponding to the at least one account is applied to the at least one account additively in a combined manner with the existing event logging policy of the at least one account; and
writing, to the data repository identified by the organization-level event logging policy, a log entry indicating a call to the one or more cloud APIs made by the at least one account.

2. The method of claim 1, further comprising:
receiving a request to add a first account to the organization;
generating, for the first account, a first event logging policy that implements the organization-level event logging policy;
identifying a second existing event logging policy associated with the first account;
applying the first event logging policy and the second existing event logging policy additively in a combined manner to log calls to the one or more cloud APIs made by the first account; and
writing, to the data repository within the cloud computing environment, one or more log entries indicating the calls to the one or more cloud APIs made by the first account.

3. The method of claim 2, further comprising:
receiving a request to remove, from the organization, a second account of the multiple accounts;
removing the second account from the multiple accounts; and
removing the respective event logging policy from the second account, wherein log entries for the second account are not removed from the data repository within the cloud computing environment, and wherein one or more account-level event logging policies associated with the second account remain unaltered.

4. The method of claim 1, wherein applying to each of the multiple accounts the respective event logging policies to log calls to the one or more cloud APIs made by the multiple accounts further comprises subscribing, at a cloud API event service, to a plurality of cloud API events as defined by the organization-level event logging policy.

5. The method of claim 1, wherein the log entry is written to the data repository according to a default value within the organization-level event logging policy.

6. The method of claim 1, wherein the organization-level event logging policy specifies event metrics, trigger alerts, and event workflows for processing called to the one or more cloud APIs.

7. A system, comprising:
one or more computer processors; and
a memory containing computer program code that, when executed by operation of the one or more computer processors, performs an operation comprising:
generating an organization-level event logging policy for an organization within a cloud computing environment, wherein the organization-level event logging policy identifies (i) whether a call to one or more cloud APIs provided within the cloud computing environment should be recorded as a log entry and (ii) a data repository within the cloud computing environment that should store the log entry;
responsive to one or more inputs indicating one or more regions in which to apply the organization-level event logging policy:
identifying a plurality of accounts included in the organization;
identifying multiple accounts of the plurality of accounts within the one or more regions; and
generating, for each of the multiple accounts, a respective event logging policy that implements the organization-level event logging policy, wherein users of the multiple accounts are prevented from modifying the respective event logging policies based on the respective event logging policies implementing the organization-level event logging policy;
applying to each of the multiple accounts the respective event logging policies to log calls to the one or more cloud APIs made by the multiple accounts, wherein at least one account of the multiple accounts has an existing event logging policy, and wherein one of the event logging policies corresponding to the at least one account is applied to the at least one account additively in a combined manner with the existing event logging policy of the at least one account; and
writing, to the data repository identified by the organization-level event logging policy, a log entry indicating a call to the one or more cloud APIs made by the multiple accounts.

8. The system of claim 7, the operation further comprising:
receiving a request to remove a first account of the multiple accounts from the organization;
removing the first account from the multiple accounts; and
removing the respective event logging policy from the first account, wherein log entries for the first account are not removed from the data repository, and wherein one or more account-level event logging policies associated with the first account remain unaltered.

9. The system of claim 7, wherein applying the organization-level event logging policy comprises:
identifying an existing event logging policy of one of the multiple accounts; and
applying the organization-level event logging policy and the existing event logging policy additively in a combined manner to log calls to the one or more cloud APIs made by the one of the multiple accounts.

10. The system of claim 7, the operation further comprising:
receiving a request to add a first account to the organization;
generating, for the first account, a first account-level event logging policy that implements the organization-level event logging policy;
identifying an existing event logging policy associated with the first account;
applying the first account-level event logging policy and the existing event logging policy additively in a combined manner to log calls to the one or more cloud APIs made by the first account; and
writing, to the data repository within the cloud computing environment, one or more log entries indicating the calls to the one or more cloud APIs made by the first account.

11. The system of claim 7, wherein the calls to the one or more cloud APIs are captured by one or more cloud services provided within the cloud computing environment, and wherein the one or more cloud APIs are provided by the one or more cloud services.

12. The system of claim 7, further comprising:
subsequent to applying the organization-level event logging policy to log calls to the one or more cloud APIs, generating a graphical user interface that depicts attributes of the organization-level event logging policy, wherein the graphical user interface depicts conditions defined by the organization-level event logging policy for logging calls to the one or more cloud APIs, and wherein the graphical user interface indicates that the organization-level event logging policy is not modifiable within the graphical user interface.

13. The system of claim 7, wherein applying to each of the multiple accounts the respective event logging policies to log calls to the one or more cloud APIs made by the multiple accounts further comprises subscribing, at a cloud API event service, to a plurality of cloud API events as defined by the organization-level event logging policy.

14. A non-transitory computer-readable medium containing computer program code that, when executed by operation of one or more computer processors, performs an operation comprising:
generating an organization-level event logging policy for an organization within a cloud computing environment, wherein the cloud computing environment includes a plurality of cloud services that provide public Application Program Interfaces (APIs), wherein the plurality of cloud services are configured to selectively generate cloud API events when calls are made to the provided public APIs, and wherein the organization-level event logging policy identifies (i) whether a call to one or more cloud APIs provided within the cloud computing environment should be recorded as a log entry and (ii) a data repository within the cloud computing environment that should store the log entry;
responsive to one or more inputs indicating one or more regions in which to apply the organization-level event logging policy:
identifying a plurality of accounts included in the organization;
identifying multiple accounts of the plurality of accounts within the one or more regions; and
generating, for each of the multiple accounts, a respective event logging policy that implements the organization-level event logging policy, wherein users of the multiple accounts are prevented from modifying the respective event logging policies based on the respective event logging policies implementing the organization-level event logging policy; and
applying to each of the multiple accounts the respective event logging policies to log calls to the one or more cloud APIs made by the multiple accounts, wherein at least one account of the multiple accounts has an existing event logging policy, wherein one of the event logging policies corresponding to the at least one account is applied to the at least one account additively in a combined manner with the existing event logging policy of the at least one account, and wherein the logged calls are stored in the data repository identified by the organization-level event logging policy.

15. The non-transitory computer-readable medium of claim 14, wherein the organization-level event logging policy is modifiable with organization-level permissions, and wherein the organization-level event logging policy is not modifiable with account level permissions.

16. The non-transitory computer-readable medium of claim 14, the operation further comprising:
writing, to the data repository identified by the organization-level event logging policy, a log entry indicating a call to the one or more cloud APIs made by the multiple accounts.

17. The non-transitory computer-readable medium of claim 14, the operation further comprising:
determining a logging usage metric for the organization over a window of time, wherein the logging usage metric is based on a number of calls to the one or more cloud APIs logged according to at least the organization-level event logging policy and is further based on a type of the calls logged; and
assessing a cost to the organization, based on the logging usage metric and according to a logging pricing schedule for the cloud computing environment.

18. The non-transitory computer-readable medium of claim 14, the operation further comprising:
receiving a request to add a first account to the organization;
generating, for the first account, a first event logging policy that implements the organization-level event logging policy;
identifying an existing event logging policy associated with the first account;
applying the first event logging policy and the existing event logging policy additively in a combined manner to log calls to the one or more cloud APIs made by the first account; and
writing, to the data repository within the cloud computing environment, one or more log entries indicating the calls to the one or more cloud APIs made by the first account.

19. The non-transitory computer-readable medium of claim 14, the operation further comprising:
receiving a request to remove, from the organization, a first account of the multiple accounts;
removing the first account from the multiple accounts; and removing the first event logging policy from the first account, wherein log entries for the first account are not removed from the data repository within the cloud computing environment, and wherein one or more account-level event logging policies associated with the first account remain unaltered.

20. The non-transitory computer-readable medium of claim 14, wherein applying to each of the multiple accounts the respective event logging policies to log calls to the one or more cloud APIs made by the multiple accounts further comprises subscribing, at a cloud API event service, to a plurality of cloud API events as defined by the organization-level event logging policy.

* * * * *